United States Patent [19]

Bunata et al.

[11] Patent Number: 4,922,193

[45] Date of Patent: May 1, 1990

[54] PRINTED CIRCUIT CARD FOR A PERSONAL COMPUTER

[75] Inventors: Thomas Bunata, Bad Aibling; Robert Hollfelder, Munich; Reiner Zieglmeier, Rottenburg; Thomas Steuer, Munich, all of Fed. Rep. of Germany

[73] Assignee: Siemens Aktiengesellschaft, Berlin and Munich, Fed. Rep. of Germany

[21] Appl. No.: 235,570

[22] Filed: Aug. 24, 1988

[51] Int. Cl.$^5$ ............................................. G01R 31/28
[52] U.S. Cl. .............................................. 324/158 R
[58] Field of Search ........... 324/73 R, 73 AT, 73 PC, 324/158 R; 371/15, 15.1

[56] References Cited

U.S. PATENT DOCUMENTS 4,055,802 10/1977 Panousis et al. ................ 324/73 AT

OTHER PUBLICATIONS

Advanced Micro Devices ISDN Evaluation Tools and System Software, pp. 1-28.
Article in Communications Engineering International, Oct. 1987, pp. 65-71.
Publication in Electronic Design, Dec. 10, 1987, pp. 85-88, entitled "Interface the ISDN to Your PC With a Voice/Data Board".

Primary Examiner—Ernest F. Karlsen
Attorney, Agent, or Firm—Hill, Van Santen, Steadman & Simpson

[57] ABSTRACT

The invention relates to a modularly constructed PC-card formed of an application-independent main board and at least one module board which is connected to the main board and which has application-dependent hardware, for identifying the module board presently connected to the main board. By interpreting the identifier, the current module configuration is always known.

4 Claims, 1 Drawing Sheet

PRINTED CIRCUIT CARD FOR A PERSONAL COMPUTER

BACKGROUND OF THE INVENTION

1. Field of the Invention

The invention relates to a Printed circuit card for a personal computer comprising a main board and at least one modular board which is connectible to the main board and which has at least one ROM in which identification is stored.

2. Description of Related Art

PC-cards, particularly user boards, are connected by contact terminals to a control means which is generally a personal computer. It is to be understood that user board 11 refers to is a hardware system with which a user can test and determine the hardware mounted on the user board, particularly the integrated circuits. Also, the user boards also considerably facilitate the development of one's own hardware and software. User boards are thus especially suited for evaluating integrated circuits.

Particularly with complex integrated circuits, it is important to first offer the user effective and user-friendly technical assistance for learning the new, complex integrated circuits, for example, ISDN modules (Integrated Services Digital Network). This is possible with the assistance of user boards. A trend toward PC-assisted boards has occurred with the increased use of personal computers (PC). The crux of such PC-assisted user boards is thus a circuit arrangement, which is referred to as a PC-card arranged on a motherboard and such PC card is plugged into a terminal strip provided in the personal computer.

PC-assisted user boards previously disclosed are composed of a PC-card which can either not be functionally expanded or adapted at all (see, for example, Electronic Design, Dec. 10, 1987, pages 85 through 88; Communications Engineering International, October 1987, pages 65 through 71; and AMD Product Information; ISDN Evaluations Tools and System Software) or that can only be functionally expanded or adapted on the basis of further pluggable cards in what is referred to as sandwich structures.

In every modularly constructed PC-card such as, for example, those in sandwich structure, it is fundamentally necessary to inform the control device of what modules the PC-card is composed. When the PC-card is composed of a main board that is application-independent and is needed for communication with the control device and to which module boards associated to the respective application are connected, then the information regarding which module boards are connected to the main board must be available to the control device.

A simple but undesirable possibility comprises providing the module board with manually actuatable switches, for example DIL switches (dual in-line switches) which can be interrogated by the control device. Of course, hard-wired bridges can also be provided instead of such switches. This undesirable solution has the additional disadvantage that maladjustments are difficult to recognize.

Another possibility of identifying the module board is to have the user to enter into a dialogue with the control device, with generally a picture screen dialogue, which informs the control device which module board is presently connected to the main board. It is especially disadvantageous in this procedure, however, for the user to be forced to correctly input a great deal of information into the control device. A simple identification of the module board does not occur with this possible solution.

A third possibility for identification of the module board is to in define a module identification code with hardwired bridges on the individual module boards. After what is referred to as a "power on" reset, the identification code of the module board which is connected to the main board is interrogated by the control device. This identified identification code serves the purpose of depositing an image of the current module configuration into the memory of the control device from a collection of module description tables that, for example, can be deposited on a diskette. The disadvantage of this solution is that it is not fully automatic as seen from the viewpoint of the user. The user must always see to it that his collection of module description tables coincides with the module boards he uses. Moreover, he must update his collection of module description tables with the description table for a new module for every new module board which is to be employed.

SUMMARY OF THE INVENTION

It is an object of the invention to provide modular PC-cards so as to allow fully automatic and correct identification of the module boards which are connected to a main board.

The invention provides that module boards which are connected to a main board are provided with a memory device which comprises an identifier for the identification of the module board. Thus, the module board contains, for example, a read memory that contains the necessary hardware description of the respective module board in the form of a table. For example, a ROM (read-only memory) that has an adequately large memory capacity can be utilized as the memory means, and the identifier of the module board is written thereinto by the developer of the module board. The ROM, for example, can contain an identification code of the respective module board and, can also contain additional information regarding the structure of the module board. However, it contains no program. The content of the ROM is produced by the developer of the module board and is modified as needed only by the developer, for example, when a new version of the module board is developed. The user, has no ability to modify the contents of the ROM.

It is a particular advantage to have the identification code stored in every ROM of a module board or at the same address. It is thus possible to also recognize when a module board is not connected to the main board.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
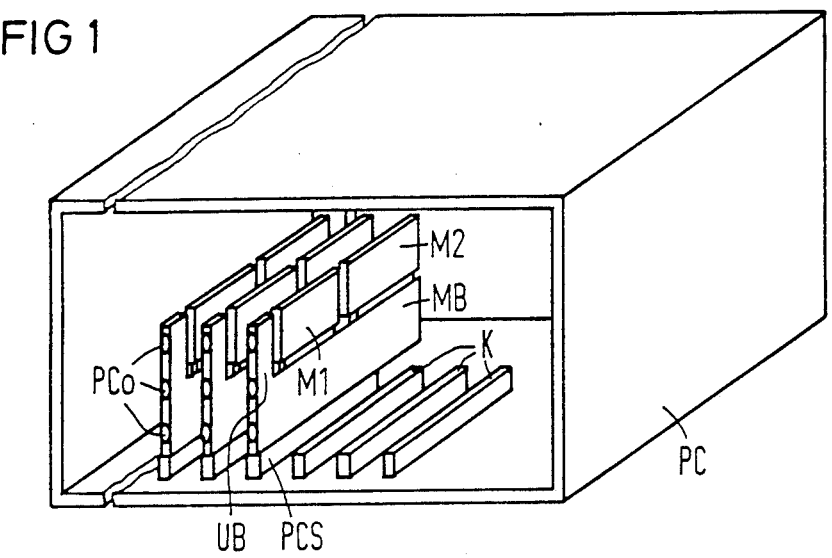
FIG. 1 illustrates a control device having a number of terminal strips for receiving PC-cards.

FIG. 1 shows the back side of a control device, for example, a personal computer PC. The personal computer PC has a limited number of terminal strips K, and a total of six terminal strips K are shown in this example. PC-cards UB, for example user boards, can be inserted into the terminal strips K by way of their contact posts PCS. Three of the terminal strips K in FIG. 1 are shown with user boards mounted thereon. The PC-cards UB are provided with periphery terminals PCo that are accessible to the user from the back side of the personal computer PC and thus serve the purpose of application-dependent connections to the environment. The PC-cards UB are thus interchangeable and allow additional circuit arrangements which are arranged on a motherboard of the control device PC to be expanded.

On the basis of the circuit arrangement arranged on the PC-cards UB and the personal computer PC which is connected thereto, the user, for example, can learn, test and possibly further develop integrated circuits or other complex hardware. For this purpose, the PC-card UB generally contains a circuit arrangement that is application-independent and is needed for communication with the personal computer PC and which contains an application-conditioned circuit arrangement that, for example, is provided with hardware which is to be evaluated. As shown in FIG. 1, the application-independent circuit arrangement is expediently accommodated on a main board MB that, for example, can be formed to be L-shaped. The application-conditioned circuit arrangement of the PC-card UB can be formed on modules M1, M2, which are connectable to the main board MB. As a result the user of such modularly constructed PC-cards UB has the possibility to implement his personal PC-card very rapidly and to modify it at any time. The user can implement his own application system rapidly and again modify it at any time by simply inserting one or more suitable module boards M1, M2 into the main board MB. Extremely complex applications can thus also be handled by connecting a plurality of such PC-cards UB into the various terminal strips of a personal computer PC.

Figure 2:
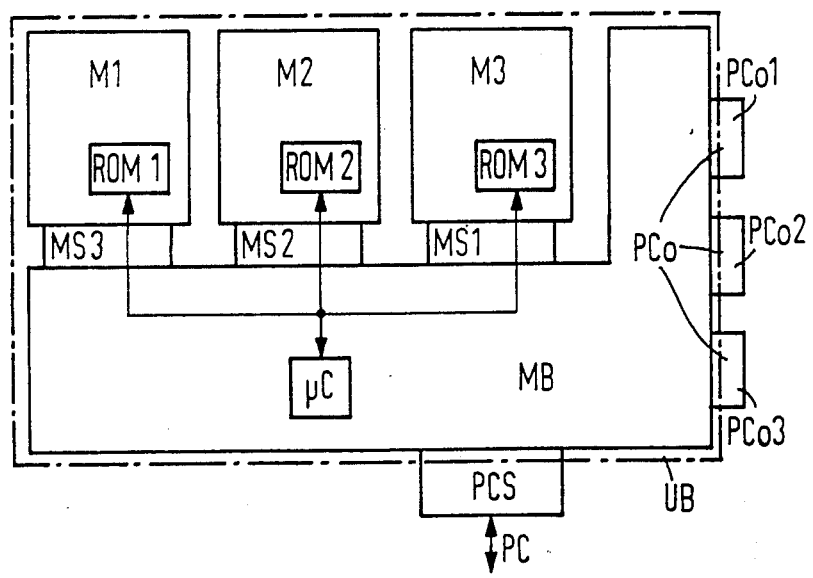
FIG. 2 is a plan view of a modular PC-card of the invention comprising a main board and module boards.

FIG. 2 shows a modularly constructed PC-card UB which have the contact terminals PCS shown in from FIG. 1. The PC-card UB comprises a main board MB and three module boards M1, M2, M3 which are arranged in the same plane as the main board MB and which are releasably connected to one another by way of plug-type connector units MS1, MS2 and MS3. Further module boards M4-M9 can be provided in FIG. 2, which are connectible to the main board MB depending on the desired application. The main board MB in FIG. 2 has roughly half the height of the PC-card UB and, for example, is fomerd to be L-shaped, and the contact terminals PCS are arranged at the outer side of the longer leg of the L. The plug-type connector units MS1, MS2 and MS3 are arranged at the inside of the longer leg of the L as shown. The main board MB also has peripheral terminals PCo on the outer side of the short leg of the L. The periphery terminals PCo can be connected to the plug-type connector units MS1, MS2 and MS3 by way of connecting lines VB1, VB2 and VB3. The periphery terminals PCo are advantageously combined to form three periphery terminal units PCo1, PCo2 and PCo3. An application-dependent connection between the outside world and the module board M1, M2 and M3 which are connected to the main board MB is achieved in that every plug-type connector unit MS1, MS2 and MS3 is connected to a different one of the peripheral terminal units PCo1, PCo2 and PCo3.

The main board MB generally contains an application-independent circuit arrangement that, however, is needed for communication with the control device PC. The module boards M1, M2, ... M9, by contrast, contain application-associated circuit arrangements, for example, integrated circuits which are to be evaluated.

According to the invention, the control device PC receives the information regarding which module is presently connected to the main board MB because the module boards M1-M9 each have a memory means, ROM, in which an identifier of the respective module board is stored. This identifier, for example, can comprise an identification code for the module board and of an additional information about the hardware mounted on the module boards M1-M9. Advantageously, the identification code of every module board is stored under an identical address. The identifier stored in the memory means ROM can be interpreted by the control device PC or by a microprocessor mounted on the main board MB. Expediently, the individual module boards have a microprocessor interface available at which the data stored in the memory means are available when the module board is connected.

The identifier stored in the memory means ROM is executed immediately after a "power on" reset of the control device occurs. As a result of the interpretation of all identifiers of the module boards M1, ... M3 which are connected to the main board MB, the control device PC and, thus, the user receives the necessary information about the current module configuration. Expediently, the identifier is deposited in the memory means with the same address and has a characteristic data structure. It is also possible to recognize when no module board M1, M2, M3 is connected to a plug-type connector unit MS1, MS2 and MS3. The control device PC or the microprocessor of the main board MB then receives a random bit pattern as reply. A repeated reading and a comparison of the characteristic data structure makes it possible to recognize with an adequately high accuracy that no module board M1 is connected to the corresponding plug-type connector unit MS1. The identifier stored in the memory means is reproduced based on an unequivocal pattern. This pattern can be recognized by the control device PC and can be further processed as information which identified which module board M1, M2, or M3 is connected to the main board MB.

Although the invention has been described with respect to preferred embodiments, it is not to be so limited as changes and modifications can be made which are within the full intended scope of the invention as defined by the appended claims.

We claim:

1. A printed circuit card composed of a main board (MB) and at least one module board (M1) connected to said main board (MB), and having contact terminals PCS for connection to a control device, such as a personal computer (PC), whereby said module board (MB) includes means for identification, characterized by: said module board (M1) contains at least one memory means (ROM1); and an identifiedr of the module board (M1) is stored in said memory means (ROM1), in that said identifier is composed of an identification code of said module board (M1) and of additional information about the circuits mounted on said module board (M1), and in that said identifier is stored under an address in the memory means (ROM1) which is identical for every module board (M1).

2. A printed circuit card according to claim 1, characterized in that said main board (MB) contains a circuit arrangement required for communication with said control device (PC); and said module board (M1) comprises an application-dependent circuit arrangement.

3. A printed circuit card according to claim 1 or 2, characterized in that said identifier can be interpreted by said control device (PC).

4. A printed circuit card according to claim 1 or 2, characterized in that said identifier can be interpreted by circuits mounted on said main board (MB).

* * * * *